July 6, 1948.　　　W. S. MASTER　　　2,444,458
RECTIFYING SYSTEM
Filed April 29, 1944
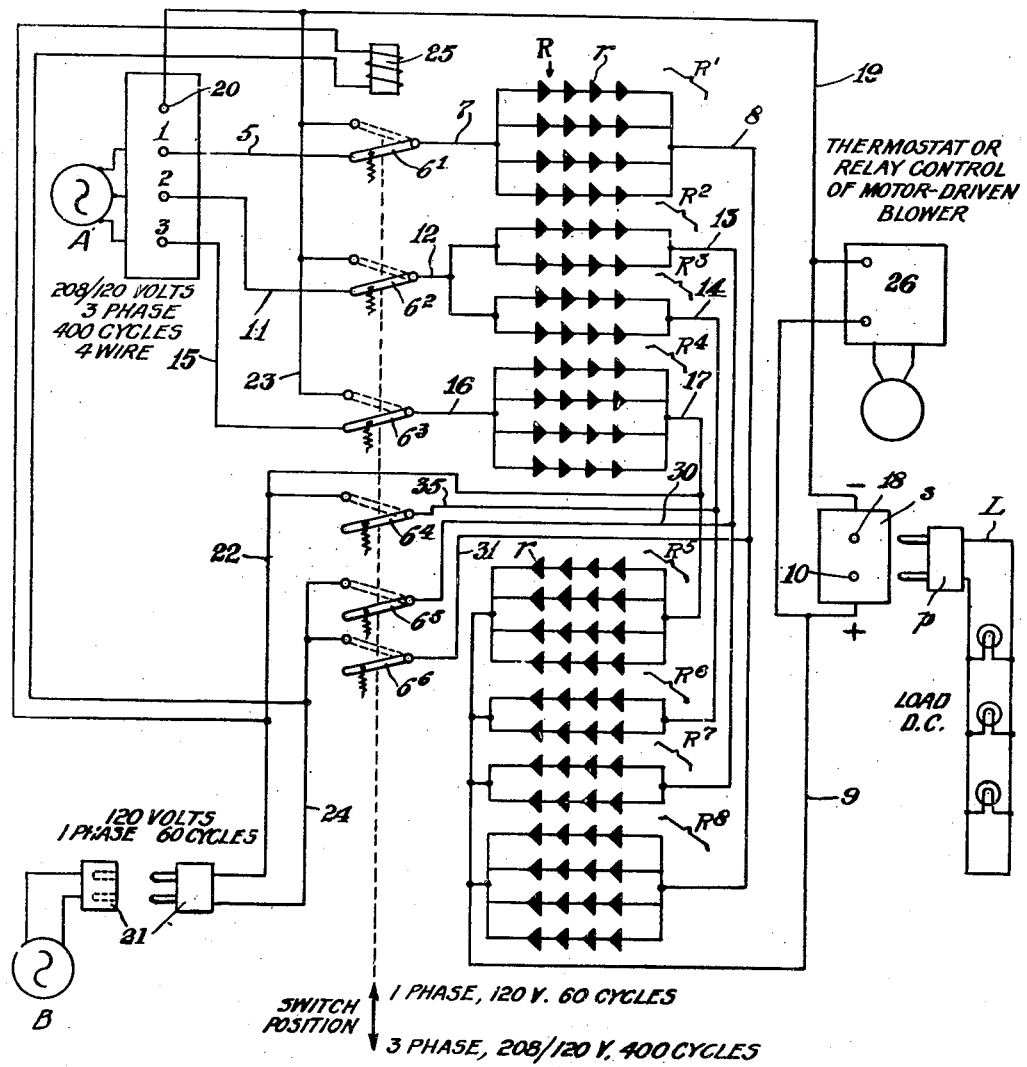
INVENTOR.
WARREN S. MASTER
BY
ATTORNEY Patented July 6, 1948

2,444,458

UNITED STATES PATENT OFFICE 2,444,458

RECTIFYING SYSTEM

Warren S. Master, Rutherford, N. J., assignor to Federal Telephone and Radio Corporation, New York, N. Y., a corporation of Delaware Application April 29, 1944, Serial No. 533,413

7 Claims. (Cl. 175—363)

1

This invention relates to improvements in rectifying systems and is particularly directed to systems for connecting a plurality of rectifying units selectively to a number of sources of alternating current having different characteristics, such as voltage, phase, and frequency, the units being interconnected in a different arrangement for each source so as to provide a predetermined average direct current voltage output from such source.

The average direct current voltage output from a rectifier depends upon several factors, in addition to the characteristics of the particular type of rectifier that is used. The direct current output is initially produced in the form of pulses, and the average voltage of the output depends not only on the peak voltage of these pulses, which of course is in turn dependent upon the alternating current input voltage, but also on the shape of the pulses and particularly on their spacing. For instance, when single phase alternating current is passed through a half wave rectifier, the individual output pulses are substantially spaced and the average direct current voltage is substantially below the peak voltage. However, when a full wave rectifier is used on the same input, the output pulses are contiguous and the average voltage is substantially higher. If a multiple phase alternating current is rectified, the direct current pulses overlap, raising the average voltage still higher. Half wave rectification will however lower the average voltage output from such a source. Frequency variations likewise change the average direct current voltage.

Another factor which influences the average direct current voltage is the resistance of the rectifier units, which ordinarily is low but nevertheless appreciable. By arranging the units in series the total resistance will be increased, while connection in parallel will decrease such resistance. Though the series and parallel connections of the units are somewhat limited by the maximum voltage and amperage characteristics of individual units, a factor that is particularly important when metal contact rectifier elements such as selenium rectifiers are employed, wide variations in the arrangement of the units in the rectifying circuit is possible within these limits. By changing the series-parallel arrangement of the rectifying units a considerable range of resistances may be provided, permitting adjustment of the average voltage output without seriously affecting the effectiveness of the rectifying system.

A feature of the invention is the provision of

2 a rectifying system including a plurality of rectifying circuit arrangements having rectifying units in common, but with the units arranged differently in the circuits, each designed for connection to one of a plurality of alternating current sources differing in characteristics such as those already enumerated. Switching means is provided for shifting the connections between the rectifier units in appropriate manner when the input connection is changed from one source to another. A specific feature is the provision of automatic switching means for this purpose.

It is frequently desirable to obtain the same average direct current output voltage from different alternating current sources and this is particularly difficult when the sources differ in voltage, phase or both. Under these circumstances it is ordinarily considered necessary to employ a transformer in order to obtain similar voltages before rectification. An important illustration is provided by the usual electrical supply system employed in aircraft, where the starting motor may be connected to the usual commercial single phase alternating current supply system available at the airport, while the rectifier system must also provide the same output voltage from the aircraft generator, which ordinarily has a three phase output at a voltage substantially different from that of the above mentioned single phase supply. A feature of the invention is the provision of a system for obtaining from such different sources a direct current output having the same average voltage; and a particular feature is the accomplishment of this purpose without requiring the use of a transformer.

Where metal contact rectifiers are employed, such as selenium rectifiers, the characteristics of rectifier plates that are not in use vary substantially from those of plates which are in use; and it is desirable to keep such plates in constant or at least frequent use to minimize variations in their characteristics. A feature of the invention is the provision of an arrangement whereby a plurality of rectifier units may be interconnected in a plurality of circuit arrangements of the type indicated above in such manner that all of such units are utilized in all of the circuits, so that all of the rectifier elements are always either in use or out of operation together. Specifically, the units are arranged so that they are uniformly loaded both for current and voltage. There are well known systems in which one circuit or another will always be in use, and this arrangement is particularly suitable in such cases since it will assure the maximum uniformity in the rectifying characteristics of the rectifier elements.

A further specific feature is the provision of an improved arrangement for shifting a plurality of rectifier elements from one series, parallel or series-parallel arrangement to another.

Other objects and advantages will appear from the following description, considered in connection with the accompanying drawing, which is a circuit diagram of one embodiment of the invention.

In the illustrated embodiment the invention is applied to the rectification of current from two sources, which are of the type ordinarily found in aircraft operation as already indicated. One source A is a three-phase generator having a 400 cycle output arranged for a four wire circuit, with an overall rated voltage of about 208 volts and a drop of 120 volts between each phase and neutral. In operation however it has been found that the phase to phase voltage will ordinarily run about 190 volts. The other source B is the usual single phase, 120 volt, 60 cycle commercial current.

A circuit system is provided for connecting these sources alternatively to a series of rectifier units R in two different arrangements which will produce the same average direct current output voltage. The units R are made up of selenium rectifier plates; and in order to carry the voltages and currents required by the indicated type of installation, it is desirable to utilize a plurality of such plates arranged in series-parallel in each unit R. However, it will be understood that this arrangement is determined by good engineering design and may be varied to meet particular requirements imposed by different sources and loads.

In the specific circuit system shown the supply terminals 1, 2 and 3 for the three phases of the alternating current from source A are connected to the rectifier units R so as to provide half wave rectification. Terminal 1 is connected through lead 5, switch 6¹, lead 7, rectifier unit R¹, lead 8, rectifier unit R⁸ and lead 9 to D.-C. positive output terminal 10. Input terminal 2 is connected through lead 11, switch 6², lead 12, rectifier units R², R³ in parallel, leads 13 and 14, rectifier units R⁶, R⁷ in parallel and lead 9 to terminal 10. Input terminal 3 is connected through lead 15, switch 6³, lead 16, rectifier unit R⁴, lead 17, rectifier unit R⁵ and lead 9 to terminal 10. The negative D.-C. output terminal 18 is connected through lead 19 to the neutral terminal 20 of the four wire system.

The rectifier units are all arranged with the same number of rectifier elements or plates r in series. Units R¹, R⁴, R⁵, R⁸ all have twice the number of series groups of elements r as the remaining rectifier units, said remaining units being illustrated as having two of such groups in parallel. The circuit arrangement of the rectifier units for use with source A therefore provides a half wave rectifying system in which each phase passes through four parallel groups of eight elements in series. This parallel-series grouping, together with the half wave rectification, produces the desired predetermined average direct current voltage output across the terminals 10, 18.

Tracing now the circuit connections between the single phase source B and the direct current output terminals 10, 18, a suitable arrangement is provided for connecting and disconnecting source B, the illustrated device for this purpose being a separable plug 21. One plug terminal is connected through lead 22 to lead 17, thence through unit R⁵ and lead 9 to positive output terminal 10, and negative terminal 18, lead 19, lead 23, switch 6³, lead 16 through unit R⁴. Lead 22 is also connected through switch 6⁴ to lead 14 and rectifier unit R⁶, lead 9 to terminal 10, lead 14 being also connected to unit R³, lead 12, switch 6², leads 23 and 19 and terminal 18.

The other terminal of plug 21 is connected through lead 24 and switch 6⁵ to lead 13, thence through rectifier unit R⁷ and lead 9 to terminal 10 and terminal 18, leads 19 and 23, switch 6², lead 12, through rectifier unit R². Lead 24 is also connected through switch 6⁶ to lead 8, thence through rectifier unit R⁸ and lead 9 to terminal 10 and through rectifier unit R¹, lead 7, switch 6¹ and leads 23 and 19 to terminal 18. This circuit system provides for the output from single phase source B a bridge type rectifying arrangement in which each arm of the bridge includes six parallel groups of four rectifier elements r in series. This arrangement produces across the terminals 10, 18 an average direct current output voltage having the desired predetermined value, which in the illustrated example is the same as the average output voltage from source A. The illustrated arrangement therefore provides the same average direct current output voltage from a single phase and a three phase source respectively, said sources differing in phase, frequency and voltage, without requiring the use of transformers.

The enumerated switches are arranged so that the output terminals 10, 18 may be connected either to source A or to source B, and the units R may be suitably rearranged. While this may be accomplished manually or in other walls, it is desirable in most instances to provide an automatic arrangement for providing the desired arrangement of units R when the output terminals are connected to a selected source. In the form shown the switches 6 are biased so that they normally connect source A to said terminals when source B is not connected and are automatically shifted to disconnect source A and connect source B with a different arrangement of units R when plug 21 is closed. This is accomplished by means of a switch-operating electro-magnet 25 connected across the leads 22, 24 and energized when source B is plugged in, the switches being arranged so that switches 6¹, 6², 6³ disconnect leads 7, 12 and 16 from source A and make connections to lead 23 when the magnet 25 is energized, whereas switches 6⁴, 6⁵, 6⁶ close the connections to the leads from source B under the same circumstances. In the specific arrangement shown it will be apparent that the latter three switches serve to prevent simultaneous connection to both sources. They also indicate generally the desired arrangement by which an actuating magnet 25 may be utilized to throw in the circuit arrangement designed for use with one source and to throw out all circuit connections providing rectifier unit arrangements for other sources when the selected source is connected to the system.

Any suitable load may be placed across the terminals 10, 18, a diagrammatic showing of a load L connected to the terminals through plug p being included. It may be desirable to connect other loads permanently across said terminals, such as the diagrammatically illustrated thermostat or relay control 26 which may be utilized to regulate the operation of a motor-driven blower used for cooling the rectifier units R, it being desirable to keep the blower connected at all times when the units are in use.

What is claimed is:

1. A rectifier system for obtaining predetermined average direct current voltage outputs from alternating current sources having different characteristics, comprising a plurality of rectifier units, a circuit system connecting the units to one source in a series parallel arrangement and producing a predetermined direct current average output voltage, a circuit system connecting the same units to another source in a bridge arrangement producing a predetermined direct current output voltage, said other source having different characteristics and means for switching the units from one circuit arrangement to another.

2. A rectifier system as set forth in claim 1, including means for connecting a source to a circuit system, the switching means including means selectively controlled by said connection for automatically connecting the units to the latter source when connected to the latter system.

3. A rectifier system as set forth in claim 1, in which the switching means includes electromagnetic means automatically selectively operated by the connection of a source to a circuit system for switching the units into the arrangement for said latter source.

4. A rectifier system for obtaining predetermined average direct current voltage outputs from alternating current sources having different characteristics, including a source having a given number of phases and a source having a lesser number of phases, comprising a plurality of rectifier units, means for selectively connecting the units to said given phase source in a half wave rectifying arrangement and means for selectively connecting the units to said lesser phase source in a full wave rectifying arrangement.

5. A rectifying system as set forth in claim 4, including switching means for connecting the rectifier units in series to the higher phase source, and for connecting said units in a rectifier bridge arrangement to the lower phase source.

6. A rectifier system for obtaining predetermined average direct current voltage outputs from alternating current sources having different characteristics such as voltage and frequency, comprising a plurality of rectifier units, means for connecting said units to one source in a rectifying arrangement having a predetermined proportion of the units in series and a predetermined portion in parallel, and means for connecting said units to another source with a different proportion of the units in series and in parallel, respectively.

7. Means for obtaining substantially the same average direct current output voltage from both polyphase and single-phase sources of supply, one having a voltage and frequency differing from the other, said means including two similar groups of rectifier units, each unit made up of a plurality of rectifier plates connected in series parallel, means for connecting the corresponding units of the two groups in series and to their respective phases of the polyphase source when it is desired to use this source and for connecting the same units in bridge relation when it is desired to use the single-phase system.

WARREN S. MASTER.

REFERENCES CITED

The following references are of record in the file of this patent:

UNITED STATES PATENTS

| Number | Name | Date |
|---|---|---|
| 1,754,799 | Mutscheller | Apr. 15, 1930 |
| 1,961,153 | Lazarus | June 5, 1934 |
| 2,050,267 | Breisch | Aug. 11, 1936 |
| 2,210,667 | Hinkelmann | Aug. 6, 1940 |
| 2,286,499 | Mittelmann | June 16, 1942 |
| 2,295,331 | Brooks | Sept. 8, 1942 |

FOREIGN PATENTS

| Number | Country | Date |
|---|---|---|
| 385,972 | Great Britain | Dec. 16, 1932 |
| 704,807 | France | Feb. 24, 1931 |